United States Patent
Li et al.

(10) Patent No.: US 12,353,055 B2
(45) Date of Patent: Jul. 8, 2025

(54) OPTICAL IMAGING LENS ASSEMBLY

(71) Applicant: Zhejiang Sunny Optics Co., Ltd., Yuyao (CN)

(72) Inventors: Yang Li, Yuyao (CN); Lingbo He, Yuyao (CN); Fujian Dai, Yuyao (CN); Liefeng Zhao, Yuyao (CN)

(73) Assignee: Zhejiang Sunny Optics Co., Ltd., Yuyao (CN)

( * ) Notice: Subject to any disclaimer, the term of this patent is extended or adjusted under 35 U.S.C. 154(b) by 24 days.

(21) Appl. No.: 17/691,083

(22) Filed: Mar. 9, 2022

(65) Prior Publication Data

US 2022/0291482 A1    Sep. 15, 2022

(30) Foreign Application Priority Data

Mar. 9, 2021 (CN) .......................... 202110254704.1

(51) Int. Cl.
*G02B 9/14* (2006.01)
*G02B 13/00* (2006.01)

(52) U.S. Cl.
CPC ........... *G02B 9/14* (2013.01); *G02B 13/0035* (2013.01)

(58) Field of Classification Search
CPC .............................. G02B 9/14; G02B 13/0035
See application file for complete search history.

(56) References Cited

U.S. PATENT DOCUMENTS

| | | | |
|---|---|---|---|
| 6,141,084 A | 10/2000 | Kitahara | |
| 2008/0212205 A1 | 9/2008 | Noda | |
| 2021/0208481 A1* | 7/2021 | Miyagishima | G02B 15/143105 |

FOREIGN PATENT DOCUMENTS

| | | |
|---|---|---|
| CN | 101477238 A | 7/2009 |
| CN | 102411191 A | 4/2012 |
| CN | 105807402 A | 7/2016 |
| CN | 110351459 A | 10/2019 |
| KR | 970071113 A | 11/1997 |

OTHER PUBLICATIONS

Chinese Office Action for counterpart Chinese Application No. 202110254704.1, dated Jul. 14, 2022, 6 pages, with references listed on p. 5 along with an indication of relevance to the counterpart Chinese application.
"Lens Design Fundamentals", Kingslake R., Johnson R.B. 2ed., AP, 2009, 11 pages.

* cited by examiner

*Primary Examiner* — Jack Dinh
(74) *Attorney, Agent, or Firm* — Reising Ethington P.C.

(57) ABSTRACT

The present disclosure discloses an optical imaging lens assembly, comprising, sequentially along an optical axis from an object side to an image side: a first lens, having a positive refractive power; a second lens, having a negative refractive power; and a third lens, having a positive refractive power. A magnification M of the optical imaging lens assembly satisfies: 0.5<M<1.5.

11 Claims, 9 Drawing Sheets

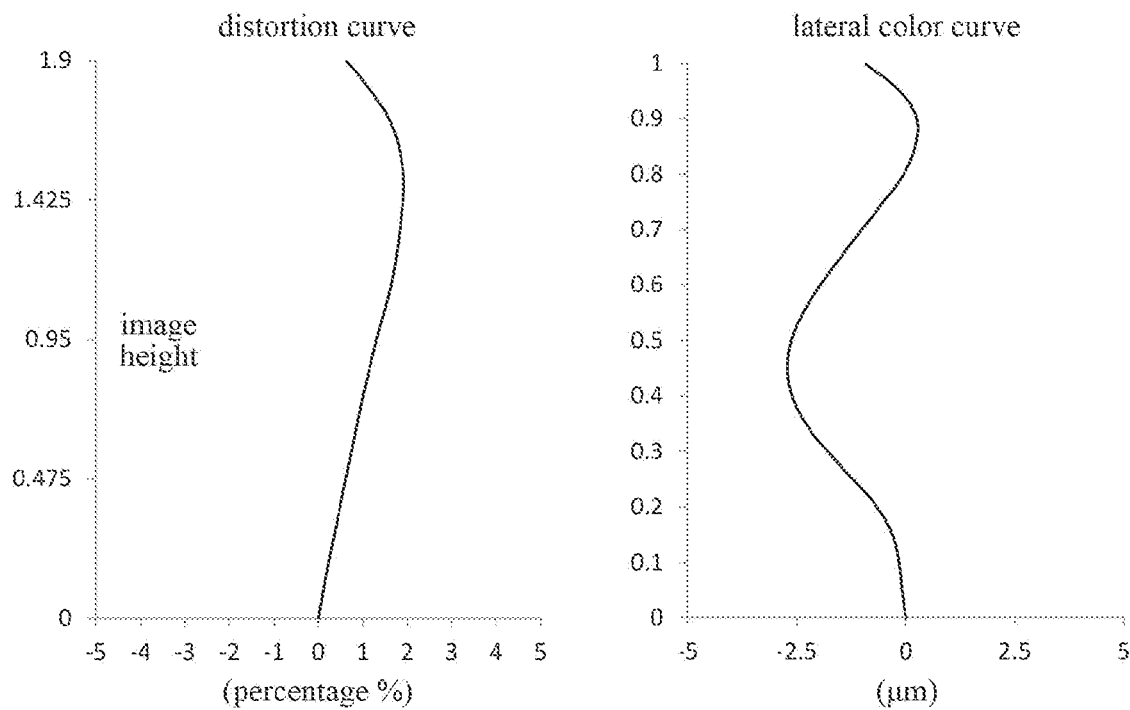
Fig. 6C
Fig. 6D
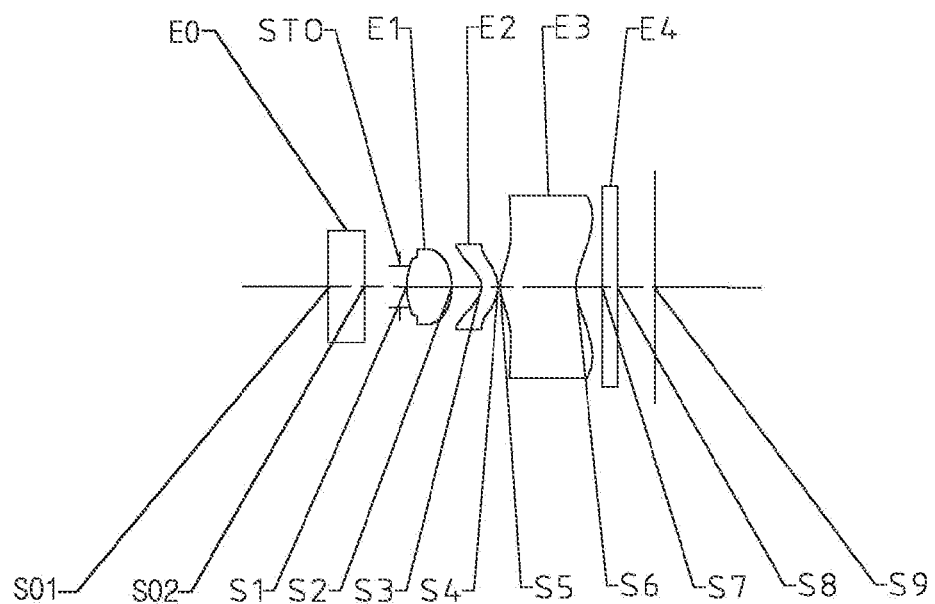
Fig. 7

OPTICAL IMAGING LENS ASSEMBLY

CROSS-REFERENCE TO RELATED APPLICATIONS

This application claims benefit of priority to Chinese Patent Application No. 202110254704.1 filed on Mar. 9, 2021 before the China National Intellectual Property Administration, the entire disclosure of which is incorporated herein by reference in its entity.

TECHNICAL FIELD

The present disclosure relates to the field of optical element, and more specifically to an optical imaging lens assembly.

BACKGROUND

In recent years, with the continuous development of portable electronic products such as smartphones, consumers have higher and higher demand for the camera capabilities, not only requiring high-quality photos, but also a variety of requirements for camera capabilities, such as the ability to clearly image distant subjects, and to enlarge the details of objects.

Therefore, in order to better adapt to the development of the market and the needs of consumers, it is expected to provide an optical imaging lens assembly that can achieve high imaging quality, being suitable for portable electronic products, and having the advantages of perfect magnification of the details of the subject, low cost, high machinability and the like.

SUMMARY

Embodiments of the present disclosure provide an optical imaging lens assembly, comprising, sequentially along an optical axis from an object side to an image side: a first lens, having a positive refractive power; a second lens, having a negative refractive power; and a third lens, having a positive refractive power. The magnification M of the optical imaging lens assembly may satisfy: $0.5<M<1.5$.

According to an implementation of the present disclosure, an effective focal length f1 of the first lens, a total effective focal length f of the optical imaging lens assembly, and an effective focal length f2 of the second lens may satisfy: $0<|f1/f+f2/f|<0.5$.

According to an implementation of the present disclosure, a distance OBL from a surface of an object close to the optical imaging lens assembly to a stop of the optical imaging lens assembly on the optical axis, and a distance TTL from an object-side surface of the first lens to an image plane of the optical imaging lens assembly along the optical axis may satisfy: $0.5<OBL/TTL<1.0$.

According to an implementation of the present disclosure, an f-number Fno of the optical imaging lens assembly and half of a maximal field-of-view Semi-FOV of the optical imaging lens assembly may satisfy: $3.5<Fno/Tan(Semi\text{-}FOV)<4.5$.

According to an implementation of the present disclosure, an effective focal length f2 of the second lens and an effective focal length f3 of the third lens may satisfy: $-1.5<f3/f2<-0.5$.

According to an implementation of the present disclosure, a center thickness CT1 of the first lens on the optical axis, a center thickness CT2 of the second lens on the optical axis, an edge thickness ET1 of the first lens, and an edge thickness ET2 of the second lens may satisfy: $3.0<CT1/ET1+ET2/CT2<4.0$.

According to an implementation of the present disclosure, a maximal effective radius DT32 of an image-side surface of the third lens and a maximal effective radius DT11 of an object-side surface of the first lens may satisfy: $3.0<DT32/DT11<3.5$.

According to an implementation of the present disclosure, an axial distance SAG11 from an intersection point of an object-side surface of the first lens and the optical axis to a vertex of an effective radius of the object-side surface of the first lens, an axial distance SAG12 from an intersection point of an image-side surface of the first lens and the optical axis to a vertex of an effective radius of the image-side surface of the first lens, and an axial distance SAG22 from an intersection point of an image-side surface of the second lens and the optical axis to a vertex of an effective radius of the image-side surface of the second lens may satisfy: $0<(SAG11+SAG12)/SAG22<1.0$.

According to an implementation of the present disclosure, an axial distance SAG12 from an intersection point of an image-side surface of the first lens and the optical axis to the vertex of an effective radius of the image-side surface of the first lens, an axial distance SAG32 from an intersection point of an image-side surface of the third lens and the optical axis to a vertex of an effective radius of the image-side surface of the third lens, and an axial distance SAG31 from an intersection point of an object-side surface of the third lens and the optical axis to a vertex of an effective radius of the object-side surface of the third lens may satisfy: $-1.5<(SAG12+SAG32)/SAG31<0.5$.

According to an implementation of the present disclosure, half of a diagonal length ImgH of an effective pixel area on an image plane of the optical imaging lens assembly, and an axial distance SAG21 from an intersection point of an object-side surface of the second lens and the optical axis to a vertex of an effective radius of the object-side surface of the second lens may satisfy: $-6.5<ImgH/SAG21<-5.0$.

According to an implementation of the present disclosure, a total effective focal length f of the optical imaging lens assembly, a radius of curvature R3 of an object-side surface of the second lens, and a radius of curvature R4 of an image-side surface of the second lens may satisfy: $-6.5<f/R3+f/R4<-4.5$.

According to an implementation of the present disclosure, a radius of curvature R5 of an object-side surface of the third lens and a radius of curvature R6 of an image-side surface of the third lens may satisfy: $4.5<(R6+R5)/(R6-R5)<6.5$.

Embodiments of the present disclosure adopt a lens assembly structure with three lenses. By reasonably distributing refractive powers and optimally selecting surface type and thickness, the optical imaging lens assembly can have at least one of the advantages of perfect magnification of the details of the subject, low cost, high machinability, high imaging quality and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIGS. 6A to 6D respectively show a longitudinal aberration curve, an astigmatic curve, a distortion curve and a lateral color curve of the optical imaging lens assembly according to Embodiment 3;

FIG. 7 is a schematic structural diagram of an optical imaging lens assembly according to Embodiment 4 of the present disclosure;

DETAILED DESCRIPTION OF EMBODIMENTS

Figure 1:
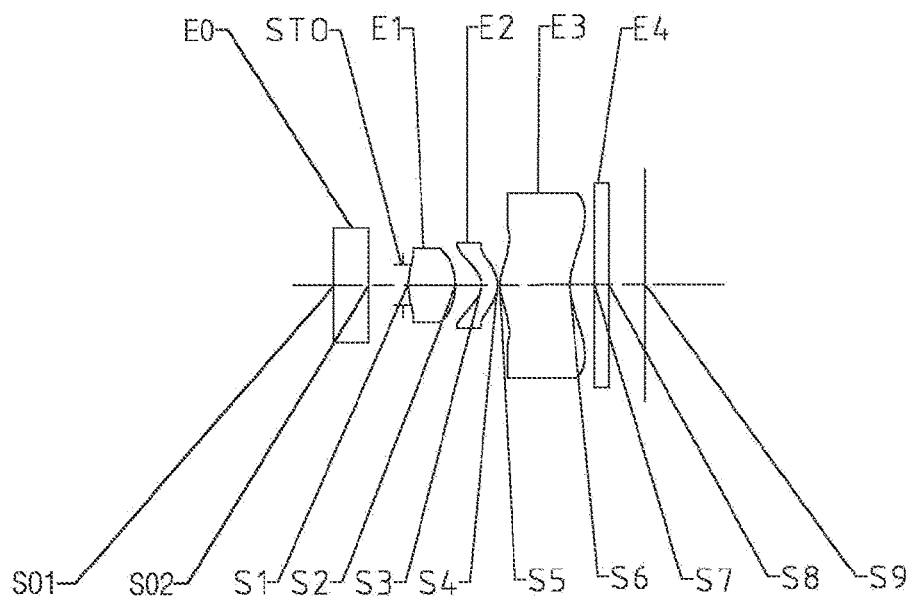
FIG. 1 is a schematic structural diagram of an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. Herein, a surface of each lens that is closest to a photographed object is referred to as the object-side surface of the lens, and a surface of the each lens that is closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure". Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure are described below in detail.

An optical imaging lens assembly according to exemplary implementations of the present disclosure may include, for example, three lenses having refractive powers, which are respectively a first lens, a second lens and a third lens. The three lenses are arranged in sequence along an optical axis from an object side to an image side.

In exemplary implementations, the first lens has a positive refractive power, the second lens has a negative refractive power, and the third lens has a positive refractive power.

In exemplary implementations, the optical imaging lens assembly according to the present disclosure may satisfy a conditional expression of $0.5 < M < 1.5$. Here, M is a magnification of the optical imaging lens assembly.

In exemplary implementations, the optical imaging lens assembly according to the present disclosure may satisfy a conditional expression of $0 < |f1/f + f2/f| < 0.5$. Here, f1 is an effective focal length of the first lens, f is a total effective focal length of the optical imaging lens assembly, and f2 is an effective focal length of the second lens. By controlling the effective focal length of the first lens, the total effective focal length of the optical imaging lens assembly and the effective focal length of the second lens to satisfy $0 < |f1/f + f2/f| < 0.5$, the optical aberration of the optical imaging lens assembly can be effectively improved and the imaging quality can be enhanced. More particularly, f1, f and f2 may satisfy $0.2<|f1/f+f2/f|<0.45$.

In exemplary implementations, the optical imaging lens assembly according to the present disclosure may satisfy a conditional expression of $0.5<OBL/TTL<1.0$. Here, OBL is a distance from a surface of the object close to the optical imaging lens assembly to a stop of the optical imaging lens assembly on the optical axis, and TTL is a distance from an object-side surface of the first lens to an image plane of the optical imaging lens assembly along the optical axis. Particularly, OBL may be a distance along the optical axis from an intersection of the surface of the object close to the optical imaging lens assembly and the optical axis to the stop of the optical imaging lens assembly. By controlling that a ratio of the distance from the intersection of the surface of the object close to the optical imaging lens assembly and the optical axis to the stop of the optical imaging lens assembly on the optical axis to the axial distance from the object-side surface of the first lens to the image plane of the optical imaging lens assembly falls within this range, it can be ensured that an object distance of the optical system is within an appropriate range, thereby ensuring the magnification of the optical system, and at the same time ensuring the miniaturization of the optical system. More particularly, OBL and TTL may satisfy $0.5<OBL/TTL<0.9$.

In exemplary implementations, the optical imaging lens assembly according to the present disclosure may satisfy a conditional expression of $3.5<Fno/Tan(Semi\text{-}FOV)<4.5$. Here, Fno is an f-number of the optical imaging lens assembly, and Semi-FOV is half of a maximal field-of-view of the optical imaging lens assembly. By controlling that the ratio of the f-number of the optical imaging lens assembly to the tangent value of half of the maximal field-of-view of the optical imaging lens assembly falls within this range, the machinability of the surface type of the optical system, as well as a light throughput and an imaging range of the optical system can be ensured. More particularly, Fno and Semi-FOV may satisfy $3.5<Fno/Tan(Semi\text{-}FOV)<4.1$.

In exemplary implementations, the optical imaging lens assembly according to the present disclosure may satisfy a conditional expression of $-1.5<f3/f2<-0.5$. Here, f3 is an effective focal length of the third lens, and f2 is the effective focal length of the second lens. By controlling the ratio of the effective focal length of the third lens to the effective focal length of the second lens to fall within this range, the aberration correction capability of the optical system can be ensured, and the resolution of the optical system can be improved. More particularly, f3 and f2 may satisfy $-1.2<f3/f2<-0.8$.

In exemplary implementations, the optical imaging lens assembly according to the present disclosure may satisfy a conditional expression of $3.0<CT1/ET1+ET2/CT2<4.0$. Here, CT1 is a center thickness of the first lens on the optical axis, CT2 is a center thickness of the second lens on the optical axis, ET1 is an edge thickness of the first lens, and ET2 is an edge thickness of the second lens. By controlling the sum of the ratio of the center thickness of the first lens on the optical axis to the edge thickness of the first lens and the ratio of the edge thickness of the second lens to the center thickness of the second lens on the optical axis falls in this range, it can be ensured that the shapes of the first and the second lenses are not too thin or too thick, and the machinability of the lenses is ensured. More particularly, CT1, CT2, ET1 and ET2 may satisfy $3.1<CT1/ET1+ET2/CT2<3.4$.

In exemplary implementations, the optical imaging lens assembly according to the present disclosure may satisfy a conditional expression of $3.0<DT32/DT11<3.5$. Here, DT32 is a maximal effective radius of an image-side surface of the third lens, and DT11 is a maximal effective radius of the object-side surface of the first lens. By controlling the maximal effective radius of an image-side surface of the third lens and the maximal effective radius of the object-side surface of the first lens fall in this range, it can be avoid that the first lens and the third lens being excessive bent, thus ensure the machinability of the first lens and the third lens, and the chromatic aberration can be corrected very well. More particularly, DT32 and DT11 may satisfy $3.1<DT32/DT11<3.5$.

In exemplary implementations, the optical imaging lens assembly according to the present disclosure may satisfy a conditional expression of $0<(SAG11+SAG12)/SAG22<1.0$. Here, SAG11 is an axial distance from an intersection point of the object-side surface of the first lens and the optical axis to a vertex of an effective radius of the object-side surface of the first lens, SAG12 is an axial distance from an intersection point of an image-side surface of the first lens and the optical axis to a vertex of an effective radius of the image-side surface of the first lens, and SAG22 is an axial distance from an intersection point of an image-side surface of the second lens and the optical axis to a vertex of an effective radius of the image-side surface of the second lens. By controlling a ratio of a sum of the axial distance from the intersection point of the object-side surface of the first lens and the optical axis to the vertex of the effective radius of the object-side surface of the first lens and the axial distance from the intersection point of the image-side surface of the first lens and the optical axis to the vertex of the effective radius of the image-side surface of the first lens to the axial distance from the intersection point of the image-side surface of the second lens and the optical axis to the vertex of the effective radius of the image-side surface of the second lens falls in this range, the tolerance sensitivity of the first lens can be reduced, which is conducive to molding and assembly of the lenses. More particularly, SAG11, SAG12 and SAG22 may satisfy $0.4<(SAG11+SAG12)/SAG22<0.8$.

In exemplary implementations, the optical imaging lens assembly according to the present disclosure may satisfy a conditional expression of $-1.5<(SAG12+SAG32)/SAG31<0.5$. Here, SAG12 is the axial distance from the intersection point of the image-side surface of the first lens and the optical axis to the vertex of the effective radius of the image-side surface of the first lens, SAG32 is an axial distance from an intersection point of the image-side surface of the third lens and the optical axis to a vertex of an effective radius of the image-side surface of the third lens, and SAG31 is an axial distance from an intersection point of an object-side surface of the third lens and the optical axis to a vertex of an effective radius of the object-side surface of the third lens. By controlling a ratio of a sum of the axial distance from the intersection point of the image-side surface of the first lens and the optical axis to the vertex of the effective radius of the image-side surface of the first lens and the axial distance from the intersection point of the image-side surface of the third lens and the optical axis to the vertex of the effective radius of the image-side surface of the third lens to the axial distance from the intersection point of the object-side surface of the third lens and the optical axis to the vertex of the effective radius of the object-side surface of the third lens falls in this range, the tolerance sensitivity of the first lens and the third lens can be reduced, which is conducive to molding and assembly of the lenses. More particularly, SAG12, SAG32 and SAG31 may satisfy $-1.2<(SAG12+SAG32)/SAG31<0.4$.

In exemplary implementations, the optical imaging lens assembly according to the present disclosure may satisfy a conditional expression of −6.5<ImgH/SAG21<−5.0. Here, ImgH is half of a diagonal length of an effective pixel area on the image plane of the optical imaging lens assembly, and SAG21 is an axial distance from an intersection point of an object-side surface of the second lens and the optical axis to a vertex of an effective radius of the object-side surface of the second lens. By controlling a ratio of half of the diagonal length of the effective pixel area on the image plane of the optical imaging lens assembly to the axial distance from the intersection point of the object-side surface of the second lens and the optical axis to the vertex of the effective radius of the object-side surface of the second lens falls in this range, an incidence angle of lights incident on the second lens can be controlled, thus the machinability and optical sensitivity of the second lens can be ensured. More particularly, ImgH and SAG21 may satisfy −6.3<ImgH/SAG21<−5.1.

In exemplary implementations, the optical imaging lens assembly according to the present disclosure may satisfy a conditional expression of −6.5<f/R3+f/R4<−4.5. Here, f is the total effective focal length of the optical imaging lens assembly, R3 is a radius of curvature of the object-side surface of the second lens, and R4 is a radius of curvature of the image-side surface of the second lens. By controlling the total effective focal length of the optical imaging lens assembly, the radius of curvature of the object-side surface of the second lens and the radius of curvature of the image-side surface of the second lens satisfy −6.5<f/R3+f/R4<−4.5, the reasonable distribution of the refractive power of the optical system can be ensureed, which is conducive to reducing the aberration of the optical system, thereby improving the imaging quality. More particularly, f, R3 and R4 may satisfy −6.3<f/R3+f/R4<−4.6.

In exemplary implementations, the optical imaging lens assembly according to the present disclosure may satisfy a conditional expression of 4.5<(R6+R5)/(R6−R5)<6.5. Here, R5 is a radius of curvature of the object-side surface of the third lens and R6 is a radius of curvature of the image-side surface of the third lens. By controlling the radius of curvature of the object-side surface of the third lens and the radius of curvature of the image-side surface of the third lens satisfy 4.5<(R6+R5)/(R6−R5)<6.5, the refractive power of the third lens can be ensured, while reducing the incident angle of the chief light to the image plane, thereby improving the illuminance of the image plane. More particularly, R5 and R6 may satisfy 4.6<(R6+R5)/(R6−R5)<5.7.

In exemplary implementations, the above optical imaging lens assembly may further include a stop. The stop may be provided at an appropriate position as required, for example, between the object side and the first lens. Alternatively, the above optical imaging lens assembly may further include an optical filter for correcting color deviations and/or a protective glass for protecting a photosensitive element on the image plane.

The optical imaging lens assembly according to the above implementations of the present disclosure may use a plurality of lenses, for example, three lenses as described above. By reasonably distributing the refractive powers and the surface types of the lenses, the center thicknesses of the lenses, the axial spacings between the lenses, etc., it is possible to effectively ensure that the lens assembly has the characteristics of perfect magnification of the details of the subject, low cost, high machinability, high imaging quality and the like, making the optical imaging lens assembly suitable for portable electronic products.

In the implementations of the present disclosure, at least one of the surfaces of the lenses is an aspheric surface. That is, at least one of the surfaces from the object-side surface of the first lens to the image-side surface of the third lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens and the third lens is an aspheric surface. Alternatively, the object-side surface and the image-side surface of each of the first lens, the second lens and the third lens are aspheric surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having three lenses is described as an example in the implementations, the optical imaging lens assembly is not limited to having the three lenses. If desired, the optical imaging lens assembly may also include other numbers of lenses.

Specific embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1 to 2D. FIG. 1 is a schematic structural diagram of the optical imaging lens assembly according to Embodiment 1 of the present disclosure.

As shown in FIG. 1, the optical imaging lens assembly includes, sequentially along an optical axis from an object side to an image side, a glass screen E0, a stop STO, a first lens E1, a second lens E2, a third lens E3 and an optical filter E4.

The glass screen E0 has an object-side surface S01 and an image-side surface S02. The first lens E1 has a positive refractive power, an object-side surface S1 of the first lens E1 is a convex surface, and an image-side surface S2 of the first lens E1 is a convex surface. The second lens E2 has a negative refractive power, an object-side surface S3 of the second lens E2 is a concave surface, and an image-side surface S4 of the second lens E2 is a convex surface. The third lens E3 has a positive refractive power, an object-side surface S5 of the third lens E3 is a concave surface, and an image-side surface S6 of the third lens E3 is a convex surface. The optical filter E4 has an object-side surface S7 and an image-side surface S8. The optical imaging lens assembly has an image plane S9, light from an object sequentially passes through the surfaces S01 to S8 and finally forms an image on the image plane S9.

Table 1 is a table showing basic parameters of the optical imaging lens assembly in Embodiment 1. Here, the units of a radius of curvature and a thickness/distance are millimeters (mm).

TABLE 1

| surface number | surface type | radius of curvature | thickness/ distance | refractive index | abbe number | conic coefficient |
|---|---|---|---|---|---|---|
| OBJ | spherical | infinite | 1.8500 | | | |
| S01 | spherical | infinite | 0.5000 | 1.52 | 64.2 | |
| S02 | spherical | infinite | 0.5000 | | | |
| STO | spherical | infinite | 0.0702 | | | |
| S1 | aspheric | 1.2388 | 0.6958 | 1.55 | 55.8 | −6.7602 |
| S2 | aspheric | −1.1170 | 0.3732 | | | 0.2490 |
| S3 | aspheric | −0.3096 | 0.2300 | 1.68 | 19.2 | −1.0317 |
| S4 | aspheric | −0.5786 | 0.0300 | | | −0.8992 |
| S5 | aspheric | −3.2783 | 0.9989 | 1.54 | 55.8 | −1.0000 |
| S6 | aspheric | −1.9878 | 0.3604 | | | −1.0000 |
| S7 | spherical | infinite | 0.2100 | 1.52 | 64.2 | |
| S8 | spherical | infinite | 0.5167 | | | |
| S9 | spherical | infinite | | | | |

In Embodiment 1, both the object-side surface and the image-side surface of any lens in the first to third lenses E1 to E3 are aspheric surfaces, and the surface type x of an aspheric lens may be defined using, but not limited to, the following formula:

$$x = \frac{ch^2}{1 + \sqrt{1 - (k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and $A_i$ is the correction coefficient of an i-th order of the aspheric surface. Tables 2 and 3 below show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1 to S6 in Embodiment 1.

TABLE 2

| surface number | $A_4$ | $A_6$ | $A_8$ | $A_{10}$ | $A_{12}$ | $A_{14}$ | $A_{16}$ |
|---|---|---|---|---|---|---|---|
| S1 | −1.33E−02 | −5.62E−03 | −1.81E−04 | −8.34E−04 | −4.60E−04 | 3.79E−04 | 4.53E−04 |
| S2 | −3.28E−02 | −7.92E−03 | 1.15E−04 | 2.28E−04 | 3.97E−04 | 3.59E−05 | 8.34E−05 |
| S3 | 5.77E−01 | −5.58E−02 | 4.98E−03 | −1.02E−02 | 4.28E−03 | 4.6E−04 | 1.45E−03 |
| S4 | 1.78E−01 | 3.35E−02 | −3.63E−04 | −1.42E−03 | 1.14E−03 | −1.83E−04 | −1.14E−05 |
| S5 | −6.84E−01 | 1.02E−01 | −2.93E−02 | 9.46E−03 | −3.31E−03 | 1.35E−03 | −5.18E−04 |
| S6 | −1.13E+00 | 1.24E−01 | −4.01E−02 | 9.06E−03 | −2.74E−03 | 7.46E−04 | −2.48E−04 |

TABLE 3

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 7.10E−05 | −1.81E−04 | −9.03E−05 | 6.16E−05 | 1.10E−04 | 5.99E−05 | 1.71E−05 |
| S2 | −1.14E−05 | 9.19E−06 | −9.39E−06 | 3.96E−06 | −4.60E−06 | 2.42E−06 | −1.38E−06 |
| S3 | −2.63E−03 | −1.52E−03 | 3.38E−04 | 1.78E−03 | 1.59E−03 | 7.95E−04 | 2.05E−04 |
| S4 | −1.08E−04 | −7.32E−05 | −3.95E−05 | −3.31E−05 | −9.21E−06 | 1.46E−06 | 5.71E−06 |
| S5 | 1.79E−04 | −7.11E−05 | 2.60E−05 | −6.33E−06 | 8.93E−07 | −6.46E−08 | 0.00E+00 |
| S6 | 2.73E−05 | 1.67E−05 | −7.09E−06 | 1.22E−06 | −1.08E−07 | 0.00E+00 | 0.00E+00 |

Figures 2A, 2B:
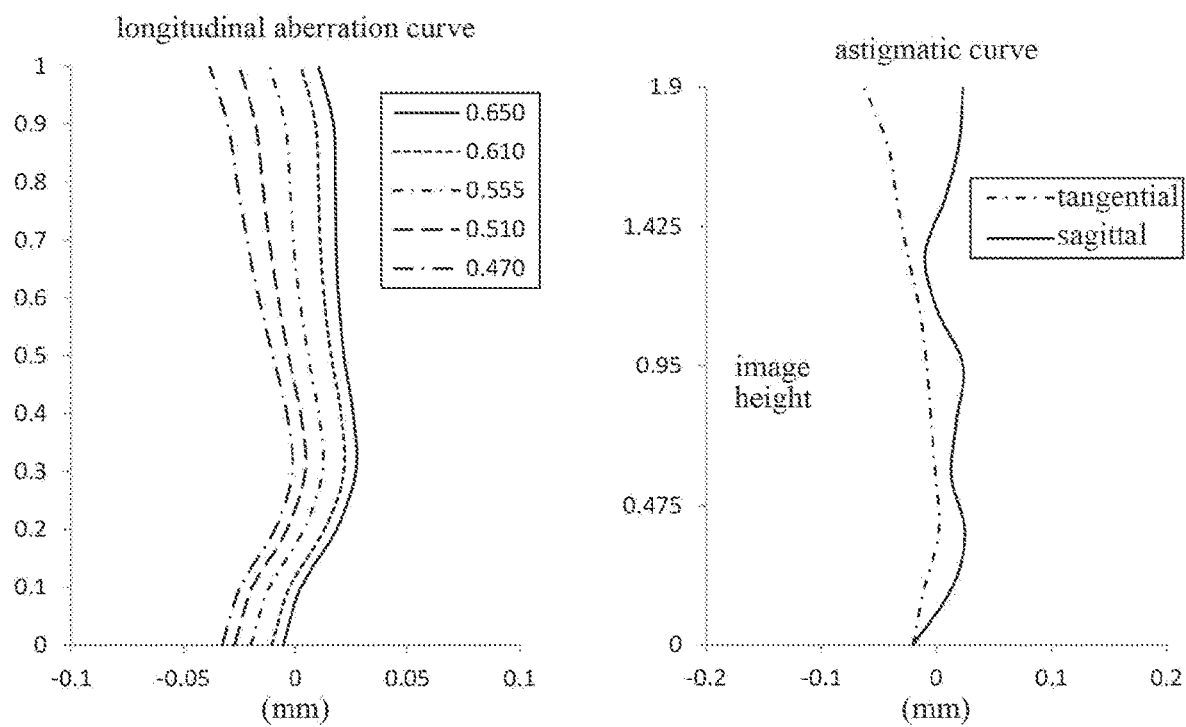
FIGS. 2A to 2D respectively show a longitudinal aberration curve, an astigmatic curve, a distortion curve and a lateral color curve of the optical imaging lens assembly according to Embodiment 1.
Figure 2C:
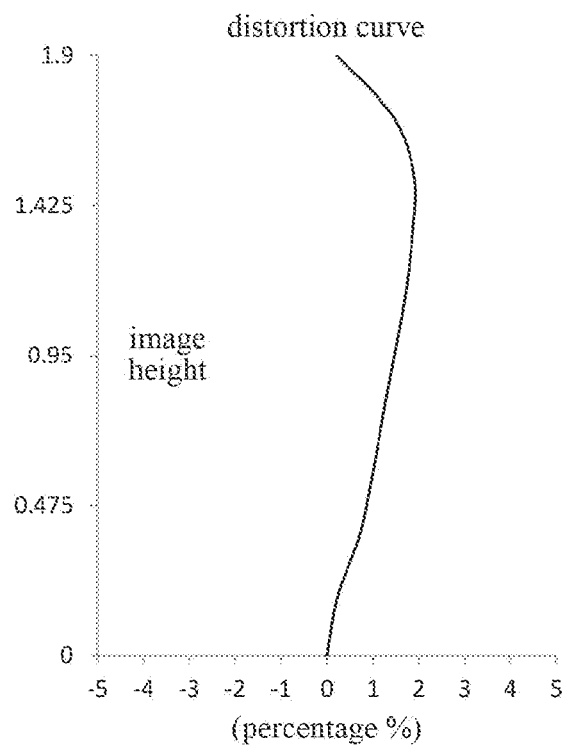
Figure 2D:
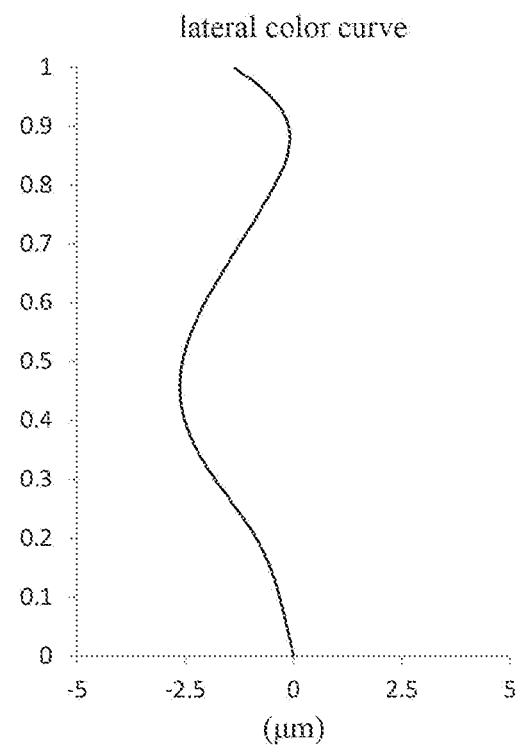

FIG. 2A illustrates a longitudinal aberration curve of the optical imaging lens assembly according to Embodiment 1, representing deviations of focal points of light of different wavelengths converged after passing through the lens assembly. FIG. 2B illustrates an astigmatic curve of the optical imaging lens assembly according to Embodiment 1, representing a curvature of a tangential image plane and a curvature of a sagittal image plane. FIG. 2C illustrates a distortion curve of the optical imaging lens assembly according to Embodiment 1, representing amounts of distortion corresponding to different image heights. FIG. 2D illustrates a lateral color curve of the optical imaging lens assembly according to Embodiment 1, representing deviations of different image heights on the image plane after light passes through the lens assembly. It can be seen from FIGS. 2A to 2D that the optical imaging lens assembly given in Embodiment 1 can achieve a good imaging quality.

Embodiment 2

Figure 3:
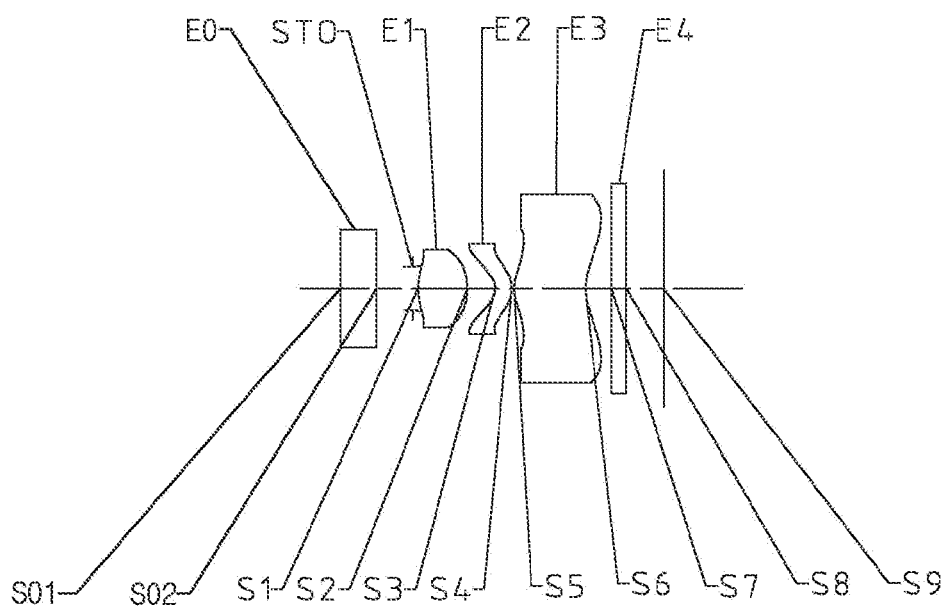
FIG. 3 is a schematic structural diagram of an optical imaging lens assembly according to Embodiment 2 of the present disclosure.

An optical imaging lens assembly according to Embodiment 2 of the present disclosure is described below with reference to FIGS. 3 to 4D. In this embodiment and the following embodiments, for the sake of brevity, some descriptions similar to those in Embodiment 1 will be omitted. FIG. 3 is a schematic structural diagram of the optical imaging lens assembly according to Embodiment 2 of the present disclosure.

As shown in FIG. 3, the optical imaging lens assembly includes, sequentially along an optical axis from an object side to an image side: a glass screen E0, a stop STO, a first lens E1, a second lens E2, a third lens E3 and an optical filter E4.

The glass screen E0 has an object-side surface S01 and an image-side surface S02. The first lens E1 has a positive refractive power, an object-side surface S1 of the first lens E1 is a convex surface, and an image-side surface S2 of the first lens E1 is a convex surface. The second lens E2 has a negative refractive power, an object-side surface S3 of the second lens E2 is a concave surface, and an image-side surface S4 of the second lens E2 is a convex surface. The third lens E3 has a positive refractive power, an object-side surface S5 of the third lens E3 is a convex surface, and an image-side surface S6 of the third lens E3 is a concave surface. The optical filter E4 has an object-side surface S7 and an image-side surface S8. The optical imaging lens assembly has an image plane S9, light from an object sequentially passes through the surfaces S01 to S8 and finally forms an image on the image plane S9.

Table 4 is a table showing basic parameters of the optical imaging lens assembly in Embodiment 2. Here, the units of a radius of curvature and a thickness/distance are millimeters (mm). Tables 5 and 6 show the high-order coefficients applicable to the aspheric surfaces in Embodiment 2. Here, the surface type of each aspheric surface may be defined using the formula (1) given in Embodiment 1.

TABLE 4

| surface number | surface type | radius of curvature | thickness/ distance | material refractive index | abbe number | conic coefficient |
|---|---|---|---|---|---|---|
| OBJ | spherical | infinite | 1.8500 | | | |
| S01 | spherical | infinite | 0.5000 | 1.52 | 64.2 | |
| S02 | spherical | infinite | 0.5000 | | | |
| STO | spherical | infinite | 0.0723 | | | |
| S1 | aspheric | 1.2368 | 0.6766 | 1.55 | 55.8 | −6.8673 |
| S2 | aspheric | −1.1285 | 0.3826 | | | 0.3098 |
| S3 | aspheric | −0.3176 | 0.2300 | 1.68 | 19.2 | −1.0287 |
| S4 | aspheric | −0.5923 | 0.0300 | | | −0.8830 |
| S5 | aspheric | 0.6630 | 0.9791 | 1.54 | 55.8 | −0.9988 |
| S6 | aspheric | 0.9999 | 0.3581 | | | −1.0143 |
| S7 | spherical | infinite | 0.2100 | 1.52 | 64.2 | |
| S8 | spherical | infinite | 0.5144 | | | |
| S9 | spherical | infinite | | | | |

TABLE 5

| surface number | $A_4$ | $A_6$ | $A_8$ | $A_{10}$ | $A_{12}$ | $A_{14}$ | $A_{16}$ |
|---|---|---|---|---|---|---|---|
| S1 | −1.37E−02 | −5.20E−03 | 2.65E−05 | −9.68E−04 | −5.82E−04 | 4.08E−04 | 5.52E−04 |
| S2 | −3.44E−02 | −7.66E−03 | 3.72E−04 | 1.10E−04 | 4.11E−04 | −2.46E−06 | 1.17E−04 |
| S3 | 5.74E−01 | −4.66E−02 | 3.92E−03 | −9.68E−03 | 4.66E−03 | 2.15E−04 | 1.33E−03 |
| S4 | 1.74E−01 | 3.57E−02 | 1.29E−04 | −1.93E−03 | 1.27E−03 | −5.69E−04 | 7.90E−05 |
| S5 | −6.84E−01 | 1.00E−01 | −2.94E−02 | 8.94E−03 | −3.59E−03 | 7.25E−04 | −5.26E−04 |
| S6 | −1.10E+00 | 1.23E−01 | −3.88E−02 | 9.64E−03 | −3.48E−03 | 7.86E−04 | −5.62E−04 |

TABLE 6

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 1.31E−04 | −2.02E−04 | −1.47E−04 | 1.81E−05 | 9.50E−05 | 6.01E−05 | 1.90E−05 |
| S2 | −2.24E−05 | 2.36E−05 | −1.65E−05 | 1.08E−05 | −7.12E−06 | 4.99E−06 | −2.80E−06 |
| S3 | −2.56E−03 | −1.27E−03 | 2.22E−04 | 1.53E−03 | 1.35E−03 | 7.18E−04 | 1.86E−04 |
| S4 | −2.24E−04 | −3.79E−05 | −4.42E−05 | −2.83E−05 | −5.26E−07 | 1.55E−06 | 6.98E−06 |
| S5 | −1.47E−04 | −2.45E−05 | −1.22E−04 | 2.08E−05 | −3.59E−05 | 3.90E−06 | 0.00E+00 |
| S6 | −8.49E−05 | −1.44E−04 | −5.75E−05 | 5.29E−05 | 3.14E−05 | 2.69E−05 | 0.00E+00 |

Figure 4A:
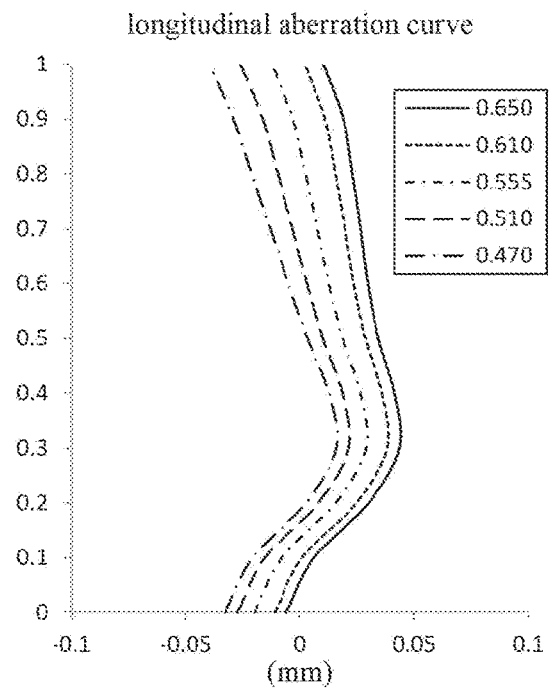
FIGS. 4A to 4D respectively show a longitudinal aberration curve, an astigmatic curve, a distortion curve and a lateral color curve of the optical imaging lens assembly according to Embodiment 2.
Figure 4B:
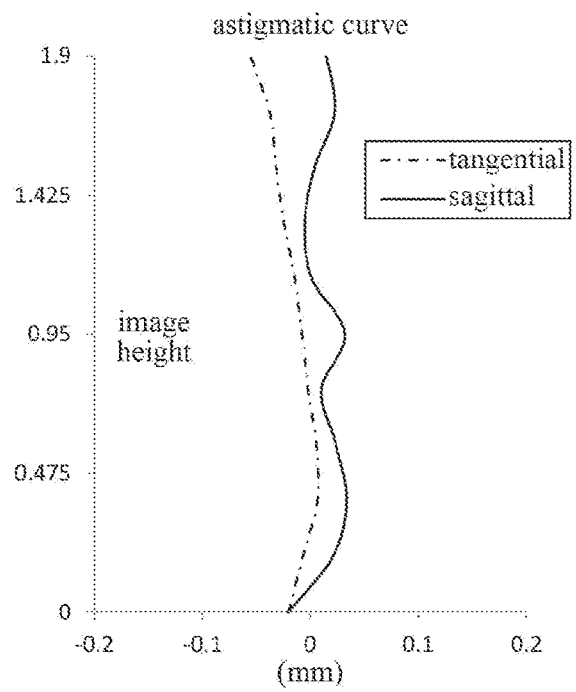
Figure 4C:
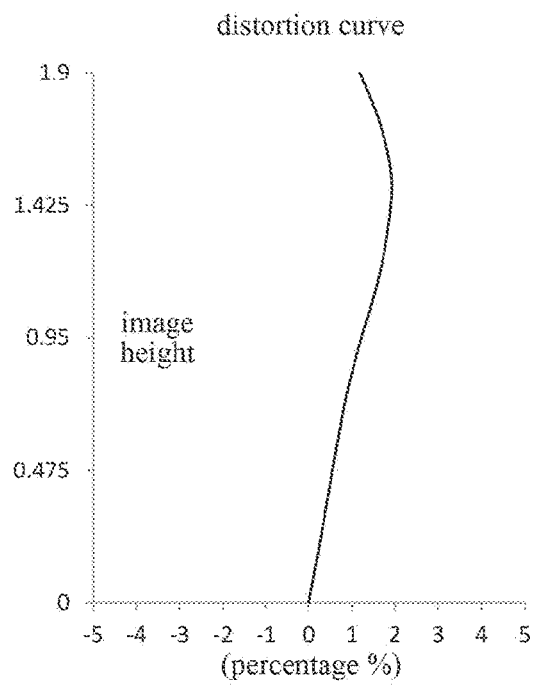
Figure 4D:
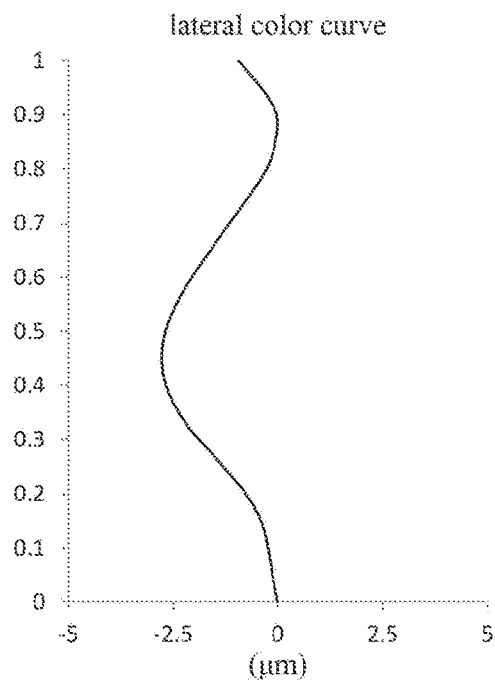

FIG. 4A illustrates a longitudinal aberration curve of the optical imaging lens assembly according to Embodiment 2, representing deviations of focal points of light of different wavelengths converged after passing through the lens assembly. FIG. 4B illustrates an astigmatic curve of the optical imaging lens assembly according to Embodiment 2, representing a curvature of a tangential image plane and a curvature of a sagittal image plane. FIG. 4C illustrates a distortion curve of the optical imaging lens assembly according to Embodiment 2, representing amounts of distortion corresponding to different image heights. FIG. 4D illustrates a lateral color curve of the optical imaging lens assembly according to Embodiment 2, representing deviations of different image heights on the image plane after light passes through the lens assembly. It can be seen from FIGS. 4A to 4D that the optical imaging lens assembly given in Embodiment 2 can achieve a good imaging quality.

Embodiment 3

Figure 5:
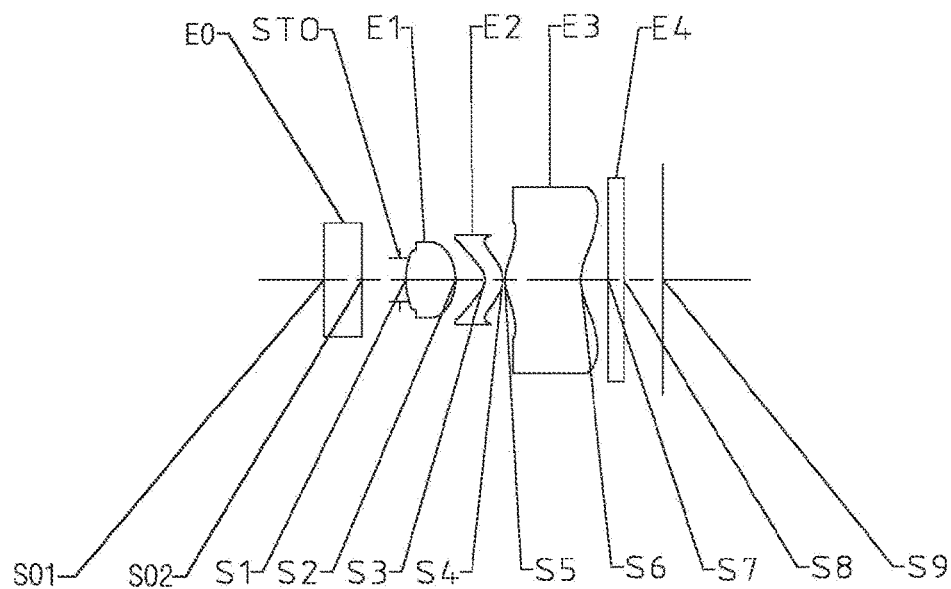
FIG. 5 is a schematic structural diagram of an optical imaging lens assembly according to Embodiment 3 of the present disclosure.

An optical imaging lens assembly according to Embodiment 3 of the present disclosure is described below with reference to FIGS. 5 to 6D. FIG. 5 is a schematic structural diagram of the optical imaging lens assembly according to Embodiment 3 of the present disclosure.

As shown in FIG. 5, the optical imaging lens assembly includes, sequentially along an optical axis from an object side to an image side: a glass screen E0, a stop STO, a first lens E1, a second lens E2, a third lens E3 and an optical filter E4.

The glass screen E0 has an object-side surface S01 and an image-side surface S02. The first lens E1 has a positive refractive power, an object-side surface S1 of the first lens E1 is a convex surface, and an image-side surface S2 of the first lens E1 is a convex surface. The second lens E2 has a negative refractive power, an object-side surface S3 of the second lens E2 is a concave surface, and an image-side surface S4 of the second lens E2 is a convex surface. The third lens E3 has a positive refractive power, an object-side surface S5 of the third lens E3 is a convex surface, and an image-side surface S6 of the third lens E3 is a concave surface. The optical filter E4 has an object-side surface S7 and an image-side surface S8. The optical imaging lens assembly has an image plane S9, light from an object sequentially passes through the surfaces S01 to S8 and finally forms an image on the image plane S9.

Table 7 is a table showing basic parameters of the optical imaging lens assembly in Embodiment 3. Here, the units of a radius of curvature and a thickness/distance are millimeters (mm). Tables 8 and 9 show the high-order coefficients applicable to the aspheric surfaces in Embodiment 3. Here, the surface type of each aspheric surface may be defined using the formula (1) given in Embodiment 1.

TABLE 7

| | | | | material | | |
|---|---|---|---|---|---|---|
| surface number | surface type | radius of curvature | thickness/ distance | refractive index | abbe number | conic coefficient |
| OBJ | spherical | infinite | 1.7383 | | | |
| S01 | spherical | infinite | 0.5000 | 1.52 | 64.2 | |
| S02 | spherical | infinite | 0.5000 | | | |
| STO | spherical | infinite | 0.0759 | | | |
| S1 | aspheric | 1.2235 | 0.6654 | 1.55 | 55.8 | −6.9833 |
| S2 | aspheric | −1.1430 | 0.3953 | | | 0.3705 |
| S3 | aspheric | −0.3235 | 0.2300 | 1.68 | 19.2 | −1.0274 |
| S4 | aspheric | −0.6054 | 0.0300 | | | −0.8772 |
| S5 | aspheric | 0.6612 | 0.9989 | 1.54 | 55.8 | −0.9805 |
| S6 | aspheric | 0.9998 | 0.3623 | | | −0.9915 |
| S7 | spherical | infinite | 0.2100 | 1.52 | 64.2 | |
| S8 | spherical | infinite | 0.5187 | | | |
| S9 | spherical | infinite | | | | |

TABLE 8

| surface number | $A_4$ | $A_6$ | $A_8$ | $A_{10}$ | $A_{12}$ | $A_{14}$ | $A_{16}$ |
|---|---|---|---|---|---|---|---|
| S1 | −3.44E−03 | −2.52E−03 | 2.87E−05 | 2.58E−04 | 8.09E−05 | 4.08E−05 | −1.85E−05 |
| S2 | −4.06E−02 | −8.14E−03 | 8.54E−04 | 5.86E−04 | 6.22E−04 | 9.28E−05 | 1.48E−04 |
| S3 | 3.09E−01 | −2.02E−02 | 9.52E−03 | −3.40E−03 | 2.38E−03 | −1.26E−03 | 2.83E−04 |
| S4 | 1.78E−01 | 3.86E−02 | 4.30E−04 | −2.02E−03 | 1.21E−03 | −7.77E−04 | −9.30E−05 |
| S5 | −6.96E−01 | 1.07E−01 | −2.91E−02 | 9.79E−03 | −3.35E−03 | 1.04E−03 | −3.96E−04 |
| S6 | −1.15E+00 | 1.27E−01 | −4.01E−02 | 9.43E−03 | −3.36E−03 | 5.17E−04 | −5.76E−04 |

TABLE 9

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −5.13E−06 | −1.51E−05 | −3.73E−06 | −7.97E−06 | −8.83E−07 | 8.73E−07 | 6.93E−06 |
| S2 | −4.68E−06 | 3.38E−05 | −1.29E−05 | 5.60E−06 | −1.83E−05 | −6.35E−06 | −1.05E−05 |
| S3 | −1.92E−04 | 7.97E−05 | −3.86E−05 | −8.75E−06 | −2.12E−05 | −1.60E−05 | −3.90E−06 |
| S4 | −3.58E−04 | −8.40E−05 | −5.14E−05 | −6.06E−06 | 2.29E−05 | 1.77E−05 | 1.38E−05 |
| S5 | −3.38E−05 | 2.42E−05 | −9.38E−05 | 3.11E−05 | −3.49E−05 | 3.16E−06 | 0.00E+00 |
| S6 | −2.24E−04 | −1.51E−04 | −6.33E−05 | 8.42E−05 | 4.83E−05 | 3.50E−05 | 0.00E+00 |

Figure 6A:
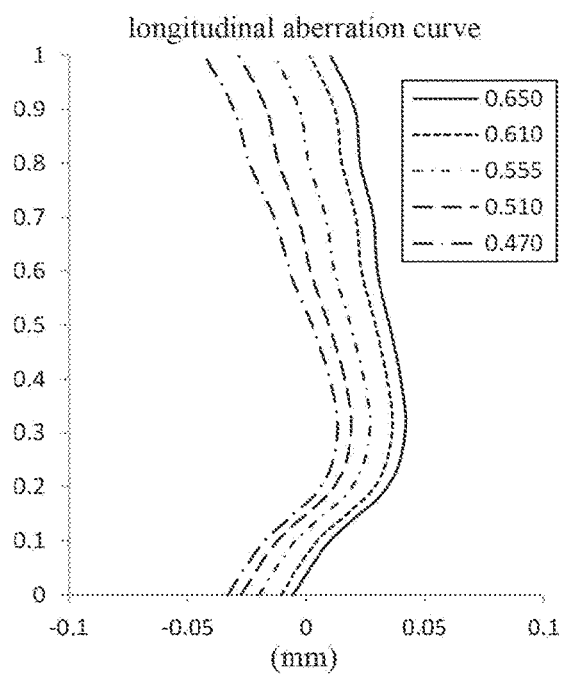
Figure 6B:
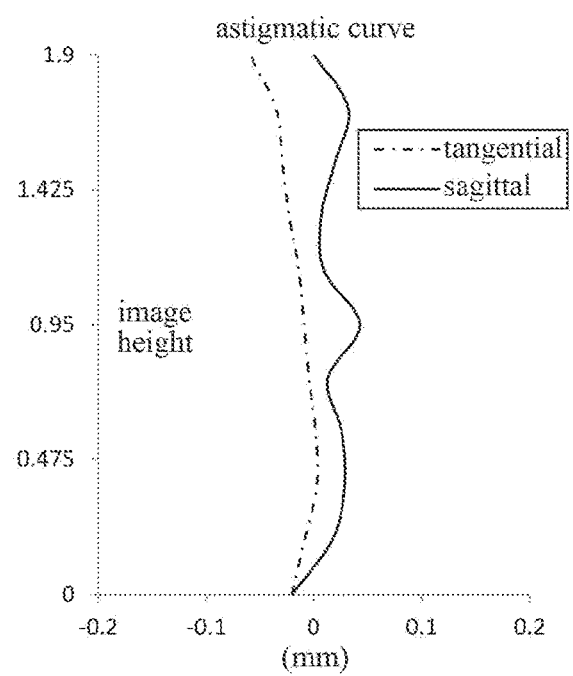

FIG. 6A illustrates a longitudinal aberration curve of the optical imaging lens assembly according to Embodiment 3, representing deviations of focal points of light of different wavelengths converged after passing through the lens assembly. FIG. 6B illustrates an astigmatic curve of the optical imaging lens assembly according to Embodiment 3, representing a curvature of a tangential image plane and a curvature of a sagittal image plane. FIG. 6C illustrates a distortion curve of the optical imaging lens assembly according to Embodiment 3, representing amounts of distortion corresponding to different image heights. FIG. 6D illustrates a lateral color curve of the optical imaging lens assembly according to Embodiment 3, representing deviations of different image heights on the image plane after light passes through the lens assembly. It can be seen from FIGS. 6A to 6D that the optical imaging lens assembly given in Embodiment 3 can achieve a good imaging quality.

Embodiment 4

An optical imaging lens assembly according to Embodiment 4 of the present disclosure is described below with reference to FIGS. 7 to 8D. FIG. 7 is a schematic structural diagram of the optical imaging lens assembly according to Embodiment 4 of the present disclosure.

As shown in FIG. 7, the optical imaging lens assembly includes, sequentially along an optical axis from an object side to an image side: a glass screen E0, a stop STO, a first lens E1, a second lens E2, a third lens E3 and an optical filter E4.

The glass screen E0 has an object-side surface S01 and an image-side surface S02. The first lens E1 has a positive refractive power, an object-side surface S1 of the first lens E1 is a convex surface, and an image-side surface S2 of the first lens E1 is a convex surface. The second lens E2 has a negative refractive power, an object-side surface S3 of the second lens E2 is a concave surface, and an image-side surface S4 of the second lens E2 is a convex surface. The third lens E3 has a positive refractive power, an object-side surface S5 of the third lens E3 is a convex surface, and an image-side surface S6 of the third lens E3 is a concave surface. The optical filter E4 has an object-side surface S7 and an image-side surface S8. The optical imaging lens assembly has an image plane S9, light from an object sequentially passes through the surfaces S01 to S8 and finally forms an image on the image plane S9.

Table 10 is a table showing basic parameters of the optical imaging lens assembly in Embodiment 4. Here, the units of a radius of curvature and a thickness/distance are millimeters (mm). Tables 11 and 12 show the high-order coefficients applicable to the aspheric surfaces in Embodiment 4. Here, the surface type of each aspheric surface may be defined using the formula (1) given in Embodiment 1.

TABLE 10

| surface number | surface type | radius of curvature | thickness/ distance | material refractive index | material abbe number | conic coefficient |
|---|---|---|---|---|---|---|
| OBJ | spherical | infinite | 1.4967 | | | |
| S01 | spherical | infinite | 0.5000 | 1.52 | 64.2 | |
| S02 | spherical | infinite | 0.5000 | | | |
| STO | spherical | infinite | 0.0881 | | | |
| S1 | aspheric | 1.1686 | 0.6275 | 1.55 | 55.8 | −6.9174 |
| S2 | aspheric | −1.1515 | 0.4104 | | | 0.5254 |
| S3 | aspheric | −0.3269 | 0.2300 | 1.68 | 19.2 | −1.0269 |
| S4 | aspheric | −0.6231 | 0.0300 | | | −0.8818 |
| S5 | aspheric | 0.6506 | 1.0470 | 1.54 | 55.8 | −0.9780 |

TABLE 10-continued

| surface number | surface type | radius of curvature | thickness/ distance | material refractive index | abbe number | conic coefficient |
|---|---|---|---|---|---|---|
| S6 | aspheric | 1.0046 | 0.3655 | | | −0.9996 |
| S7 | spherical | infinite | 0.2100 | 1.52 | 64.2 | |
| S8 | spherical | infinite | 0.5216 | | | |
| S9 | spherical | infinite | | | | |

TABLE 11

| surface number | $A_4$ | $A_6$ | $A_8$ | $A_{10}$ | $A_{12}$ | $A_{14}$ | $A_{16}$ |
|---|---|---|---|---|---|---|---|
| S1 | −2.86E−03 | −2.70E−03 | 5.83E−06 | 2.56E−04 | 9.84E−04 | 4.46E−05 | −2.10E−05 |
| S2 | −3.93E−02 | −8.58E−03 | 4.88E−04 | 6.63E−04 | 6.67E−04 | 2.06E−04 | 1.77E−04 |
| S3 | 2.73E−01 | −1.85E−02 | 8.70E−03 | −2.68E−03 | 2.24E−03 | −9.96E−04 | 1.61E−04 |
| S4 | 1.37E−01 | 3.34E−02 | 1.13E−03 | −1.92E−03 | 1.40E−03 | −4.31E−04 | 1.54E−04 |
| S5 | −7.08E−01 | 1.16E−01 | −3.00E−02 | 1.01E−02 | −3.20E−03 | 1.07E−03 | −9.06E−05 |
| S6 | −1.07E+00 | 1.24E−01 | −3.45E−02 | 7.88E−03 | −1.96E−03 | 5.97E−04 | 3.33E−04 |

TABLE 12

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −1.24E−05 | −2.01E−05 | −5.80E−06 | −7.14E−06 | 1.32E−06 | 3.07E−06 | 6.45E−06 |
| S2 | 1.29E−05 | 2.25E−05 | −1.97E−05 | −8.57E−06 | −2.29E−05 | −9.45E−06 | −9.36E−06 |
| S3 | −1.96E−04 | 1.12E−05 | −4.52E−06 | −1.00E−05 | −6.27E−07 | −1.71E−05 | −2.32E−06 |
| S4 | −1.54E−04 | −7.54E−05 | −5.21E−05 | −5.78E−05 | −1.89E−05 | −1.00E−05 | 4.73E−07 |
| S5 | −2.93E−05 | 1.34E−04 | −1.05E−04 | 6.22E−05 | −2.99E−05 | 5.51E−06 | 0.00E+00 |
| S6 | −2.00E−04 | 9.27E−05 | −9.82E−05 | 2.72E−04 | 1.24E−04 | 1.28E−04 | 0.00E+00 |

Figure 8A:
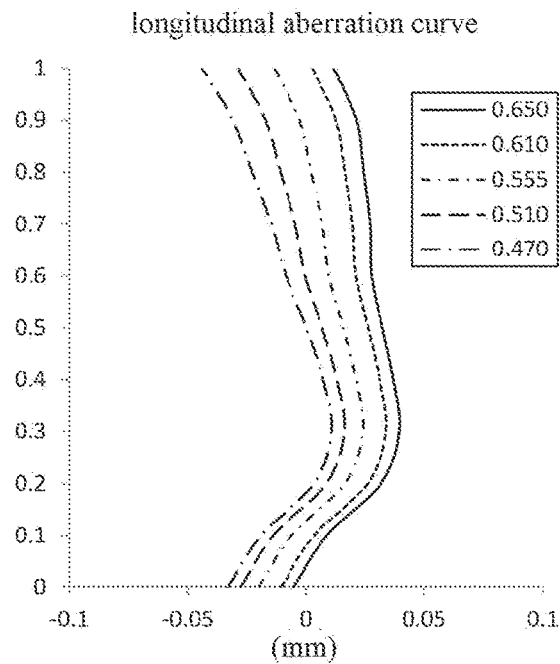
FIGS. 8A to 8D respectively show a longitudinal aberration curve, an astigmatic curve, a distortion curve and a lateral color curve of the optical imaging lens assembly according to Embodiment 4.
Figure 8B:
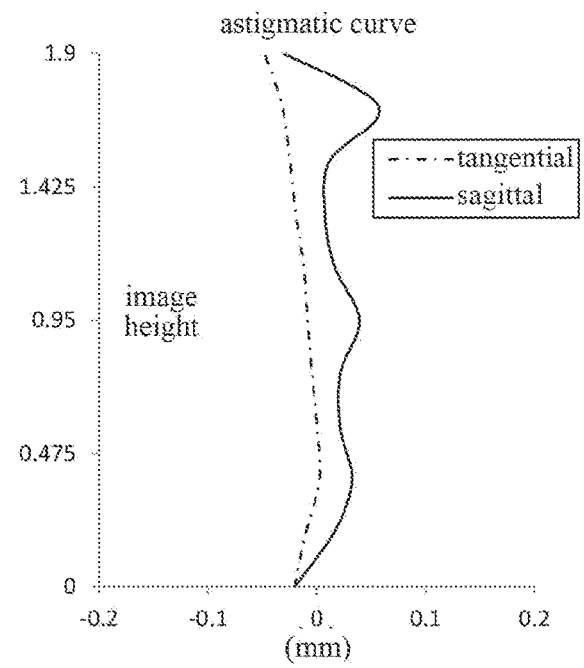
Figure 8C:
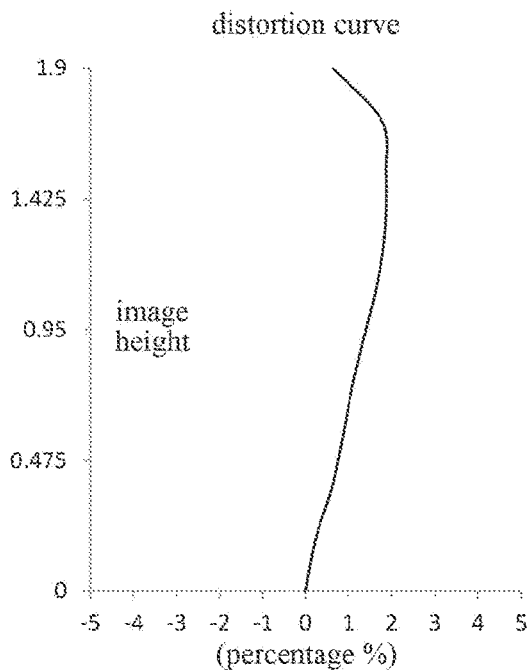
Figure 8D:
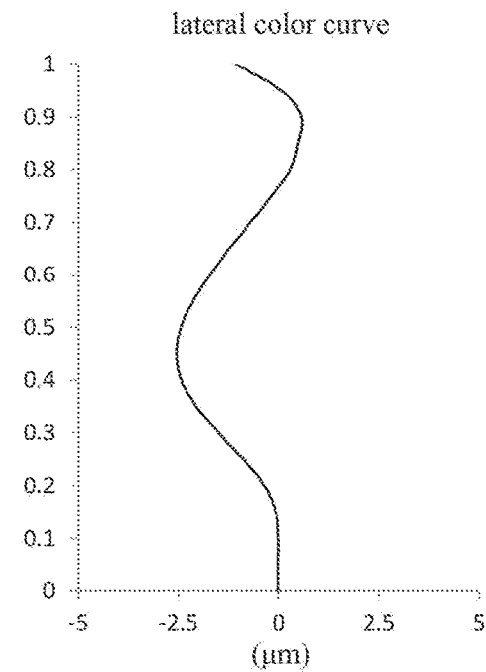

FIG. 8A illustrates a longitudinal aberration curve of the optical imaging lens assembly according to Embodiment 4, representing deviations of focal points of light of different wavelengths converged after passing through the lens assembly. FIG. 8B illustrates an astigmatic curve of the optical imaging lens assembly according to Embodiment 4, representing a curvature of a tangential image plane and a curvature of a sagittal image plane. FIG. 8C illustrates a distortion curve of the optical imaging lens assembly according to Embodiment 4, representing amounts of distortion corresponding to different image heights. FIG. 8D illustrates a lateral color curve of the optical imaging lens assembly according to Embodiment 4, representing deviations of different image heights on the image plane after light passes through the lens assembly. It can be seen from FIGS. 8A to 8D that the optical imaging lens assembly given in Embodiment 4 can achieve a good imaging quality.

Embodiment 5

Figure 9:
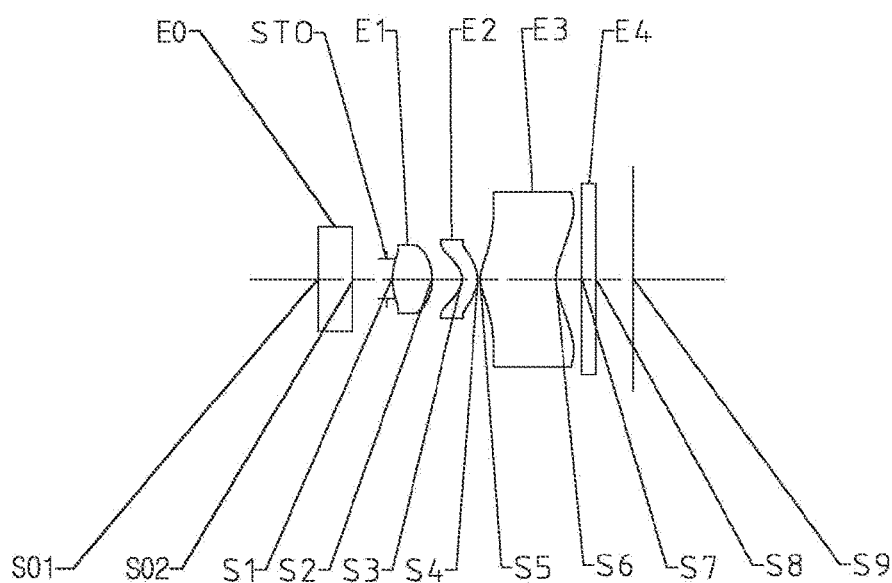
FIG. 9 is a schematic structural diagram of an optical imaging lens assembly according to Embodiment 5 of the present disclosure.

An optical imaging lens assembly according to Embodiment 5 of the present disclosure is described below with reference to FIGS. 9 to 10D. FIG. 9 is a schematic structural diagram of the optical imaging lens assembly according to Embodiment 5 of the present disclosure.

As shown in FIG. 9, the optical imaging lens assembly includes, sequentially along an optical axis from an object side to an image side: a glass screen E0, a stop STO, a first lens E1, a second lens E2, a third lens E3 and an optical filter E4.

The glass screen E0 has an object-side surface S01 and an image-side surface S02. The first lens E1 has a positive refractive power, an object-side surface S1 of the first lens E1 is a convex surface, and an image-side surface S2 of the first lens E1 is a convex surface. The second lens E2 has a negative refractive power, an object-side surface S3 of the second lens E2 is a concave surface, and an image-side surface S4 of the second lens E2 is a convex surface. The third lens E3 has a positive refractive power, an object-side surface S5 of the third lens E3 is a convex surface, and an image-side surface S6 of the third lens E3 is a concave surface. The optical filter E4 has an object-side surface S7 and an image-side surface S8. The optical imaging lens assembly has an image plane S9, light from an object sequentially passes through the surfaces S01 to S8 and finally forms an image on the image plane S9.

Table 13 is a table showing basic parameters of the optical imaging lens assembly in Embodiment 5. Here, the units of a radius of curvature and a thickness/distance are millimeters (mm). Tables 14 and 15 show the high-order coefficients applicable to the aspheric surfaces in Embodiment 5. Here, the surface type of each aspheric surface may be defined using the formula (1) given in Embodiment 1.

TABLE 13

| surface number | surface type | radius of curvature | thickness/ distance | material refractive index | material abbe number | conic coefficient |
|---|---|---|---|---|---|---|
| OBJ | spherical | infinite | 1.0283 | | | |
| S01 | spherical | infinite | 0.5000 | 1.52 | 64.2 | |
| S02 | spherical | infinite | 0.5000 | | | |
| STO | spherical | infinite | 0.0786 | | | |
| S1 | aspheric | 1.0773 | 0.5790 | 1.55 | 55.8 | −6.7443 |
| S2 | aspheric | −1.1251 | 0.4450 | | | 0.5662 |
| S3 | aspheric | −0.3266 | 0.2300 | 1.68 | 19.2 | −1.0291 |
| S4 | aspheric | −0.6302 | 0.0300 | | | −0.8729 |
| S5 | aspheric | 0.6139 | 1.0896 | 1.54 | 55.8 | −0.9610 |
| S6 | aspheric | 0.9364 | 0.3802 | | | −0.9485 |
| S7 | spherical | infinite | 0.2100 | 1.52 | 64.2 | |
| S8 | spherical | infinite | 0.5363 | | | |
| S9 | spherical | infinite | | | | |

TABLE 14

| surface number | $A_4$ | $A_6$ | $A_8$ | $A_{10}$ | $A_{12}$ | $A_{14}$ | $A_{16}$ |
|---|---|---|---|---|---|---|---|
| S1 | −1.77E−03 | −2.75E−03 | −1.11E−04 | 2.13E−04 | 7.82E−05 | 6.53E−05 | 1.21E−06 |
| S2 | −3.07E−02 | −8.33E−03 | −3.93E−04 | 3.15E−04 | 3.21E−04 | 9.81E−05 | 1.07E−04 |
| S3 | 2.27E−01 | −1.92E−02 | 8.08E−03 | −2.39E−03 | 1.95E−03 | −6.58E−04 | 1.44E−04 |
| S4 | 1.07E−01 | 2.86E−02 | 1.98E−03 | −1.74E−03 | 1.31E−03 | −3.27E−04 | 2.10E−04 |
| S5 | −8.10E−01 | 1.42E−01 | −3.66E−02 | 1.29E−02 | −4.36E−03 | 1.52E−03 | −2.97E−04 |
| S6 | −1.10E+00 | 1.36E−01 | −3.37E−02 | 8.87E−03 | −1.89E−03 | 4.63E−04 | 2.59E−04 |

TABLE 15

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 9.69E−06 | −9.27E−06 | 3.44E−07 | −7.58E−06 | −3.50E−06 | −3.65E−06 | 4.25E−06 |
| S2 | 2.57E−05 | 3.18E−05 | 5.55E−06 | 8.54E−06 | −3.70E−06 | −1.25E−06 | −3.48E−06 |
| S3 | −1.11E−04 | −1.09E−05 | 1.13E−05 | −8.92E−06 | 1.01E−05 | −7.41E−06 | 2.72E−06 |
| S4 | −4.72E−05 | −1.25E−05 | 9.28E−07 | −2.58E−05 | −5.10E−06 | −7.95E−06 | 3.31E−07 |
| S5 | 8.99E−06 | 1.23E−04 | −1.31E−04 | 8.02E−05 | −6.61E−05 | 2.19E−05 | 0.00E+00 |
| S6 | −3.16E−04 | −5.98E−06 | −2.49E−04 | 1.39E−04 | 6.95E−05 | 1.42E−04 | 0.00E+00 |

Figure 10A:
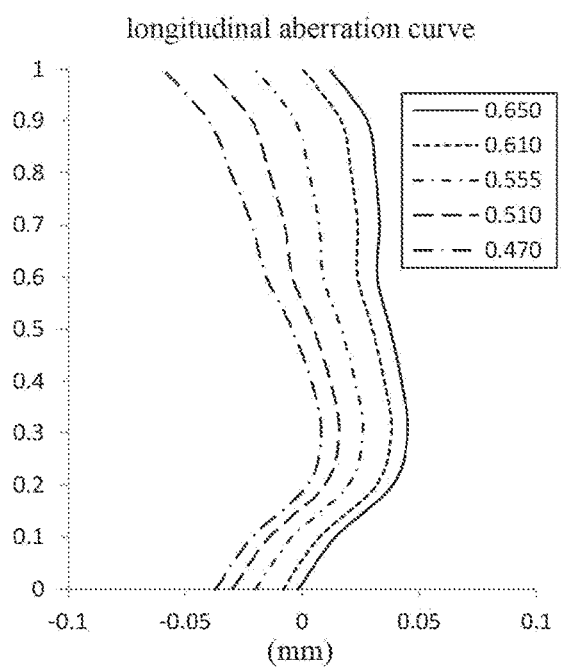
FIGS. 10A to 10D respectively show a longitudinal aberration curve, an astigmatic curve, a distortion curve and a lateral color curve of the optical imaging lens assembly according to Embodiment 5.
Figure 10B:
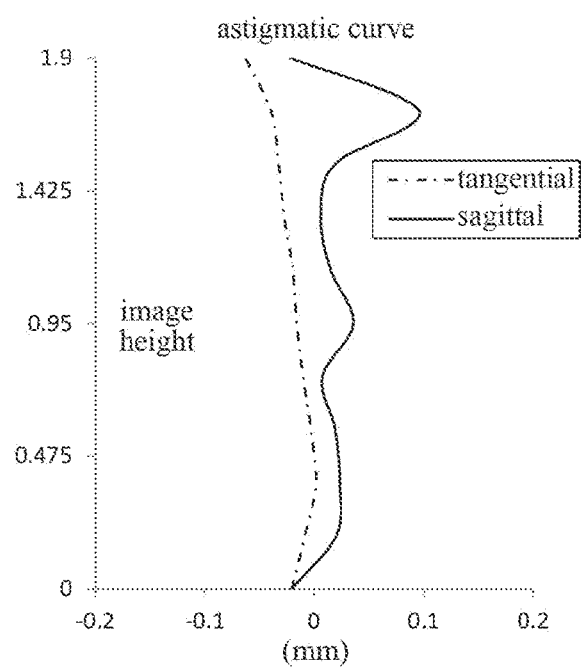
Figures 10C, 10D:
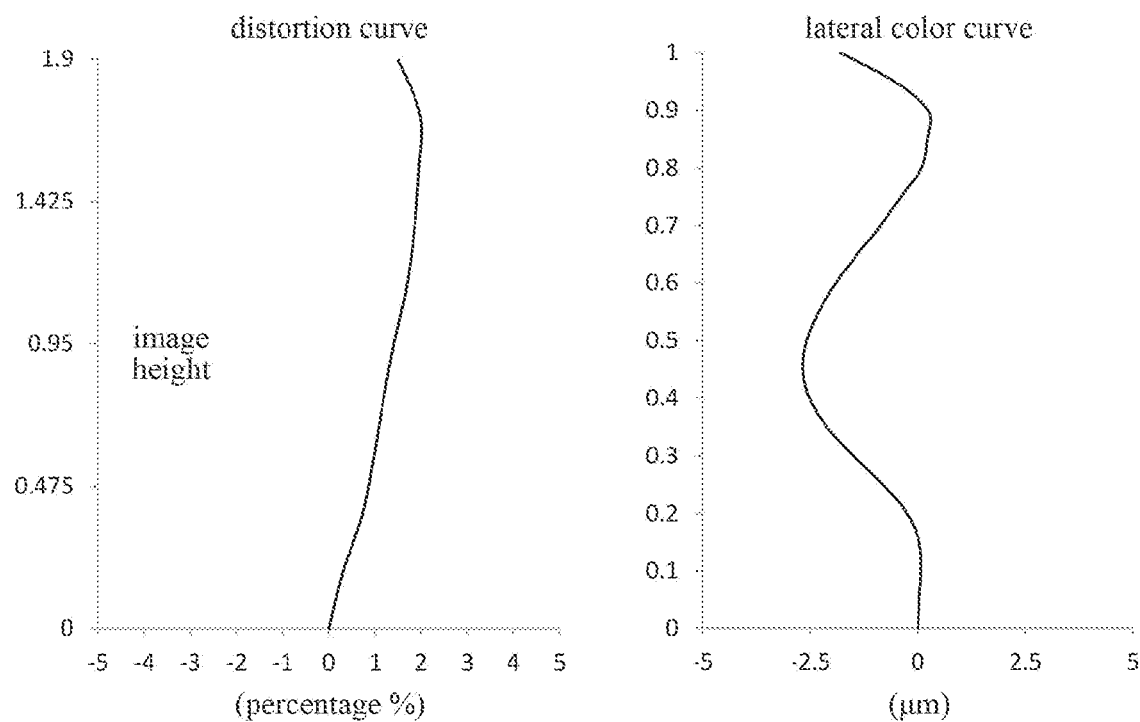

FIG. 10A illustrates a longitudinal aberration curve of the optical imaging lens assembly according to Embodiment 5, representing deviations of focal points of light of different wavelengths converged after passing through the lens assembly. FIG. 10B illustrates an astigmatic curve of the optical imaging lens assembly according to Embodiment 5, representing a curvature of a tangential image plane and a curvature of a sagittal image plane. FIG. 10C illustrates a distortion curve of the optical imaging lens assembly according to Embodiment 5, representing amounts of distortion corresponding to different image heights. FIG. 10D illustrates a lateral color curve of the optical imaging lens assembly according to Embodiment 5, representing deviations of different image heights on the image plane after light passes through the lens assembly. It can be seen from FIGS. 10A to 10D that the optical imaging lens assembly given in Embodiment 5 can achieve a good imaging quality.

Embodiment 6

Figure 11:
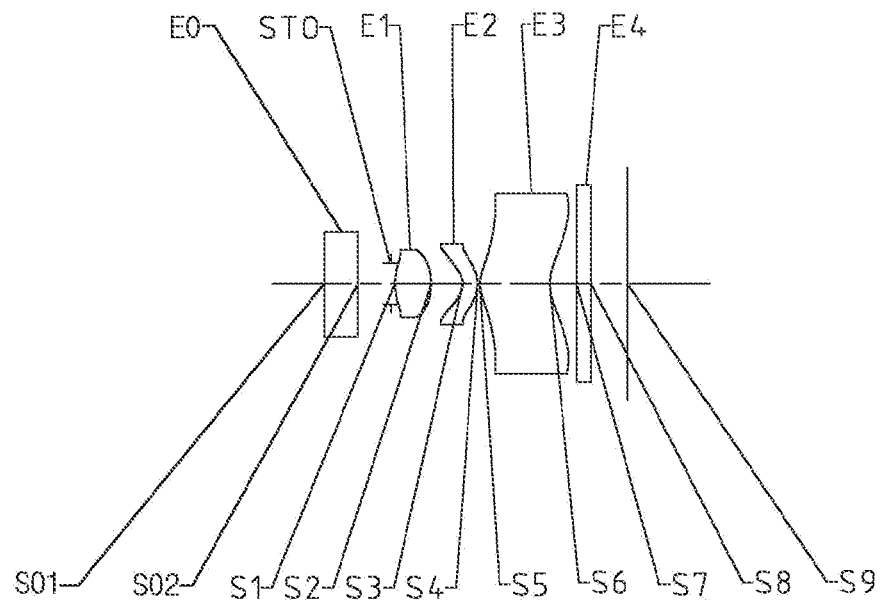
FIG. 11 is a schematic structural diagram of an optical imaging lens assembly according to Embodiment 6 of the present disclosure.

An optical imaging lens assembly according to Embodiment 6 of the present disclosure is described below with reference to FIGS. 11 to 12D. FIG. 11 is a schematic structural diagram of the optical imaging lens assembly according to Embodiment 6 of the present disclosure.

As shown in FIG. 11, the optical imaging lens assembly includes, sequentially along an optical axis from an object side to an image side: a glass screen E0, a stop STO, a first lens E1, a second lens E2, a third lens E3 and an optical filter E4.

The glass screen E0 has an object-side surface S01 and an image-side surface S02. The first lens E1 has a positive refractive power, an object-side surface S1 of the first lens E1 is a convex surface, and an image-side surface S2 of the first lens E1 is a convex surface. The second lens E2 has a negative refractive power, an object-side surface S3 of the second lens E2 is a concave surface, and an image-side surface S4 of the second lens E2 is a convex surface. The third lens E3 has a positive refractive power, an object-side surface S5 of the third lens E3 is a convex surface, and an image-side surface S6 of the third lens E3 is a concave surface. The optical filter E4 has an object-side surface S7 and an image-side surface S8. The optical imaging lens assembly has an image plane S9, light from an object sequentially passes through the surfaces S01 to S8 and finally forms an image on the image plane S9.

Table 16 is a table showing basic parameters of the optical imaging lens assembly in Embodiment 6. Here, the units of a radius of curvature and a thickness/distance are millimeters (mm). Tables 17 and 18 show the high-order coefficients applicable to the aspheric surfaces in Embodiment 6. Here, the surface type of each aspheric surface may be defined using the formula (1) given in Embodiment 1.

TABLE 16

| surface number | surface type | radius of curvature | thickness/ distance | material refractive index | material abbe number | conic coefficient |
|---|---|---|---|---|---|---|
| OBJ | spherical | infinite | 0.7714 | | | |
| S01 | spherical | infinite | 0.5000 | 1.52 | 64.2 | |
| S02 | spherical | infinite | 0.5000 | | | |
| STO | spherical | infinite | 0.0551 | | | |
| S1 | aspheric | 1.0266 | 0.5462 | 1.55 | 55.8 | −6.8552 |
| S2 | aspheric | −1.0829 | 0.4731 | | | 0.6451 |
| S3 | aspheric | −0.3248 | 0.2300 | 1.68 | 19.2 | −1.0285 |
| S4 | aspheric | −0.6168 | 0.0300 | | | −0.8700 |
| S5 | aspheric | 0.5859 | 1.0454 | 1.54 | 55.8 | −0.9685 |
| S6 | aspheric | 0.8425 | 0.4046 | | | −0.9929 |
| S7 | spherical | infinite | 0.2100 | 1.52 | 64.2 | |
| S8 | spherical | infinite | 0.5607 | | | |
| S9 | spherical | infinite | | | | |

TABLE 17

| surface number | $A_4$ | $A_6$ | $A_8$ | $A_{10}$ | $A_{12}$ | $A_{14}$ | $A_{16}$ |
|---|---|---|---|---|---|---|---|
| S1 | −1.63E−03 | −2.75E−03 | −3.47E−05 | 2.57E−04 | 7.38E−05 | 4.04E−05 | −3.40E−05 |
| S2 | −2.80E−02 | −8.54E−03 | −5.45E−04 | 5.22E−04 | 3.73E−04 | 1.55E−04 | 8.68E−05 |
| S3 | 2.11E−01 | −2.01E−02 | 8.24E−03 | −2.15E−03 | 1.79E−03 | −6.44E−04 | 3.27E−05 |
| S4 | 1.01E−01 | 2.81E−02 | 2.39E−03 | −1.53E−03 | 1.28E−03 | −3.33E−04 | 1.83E−04 |
| S5 | −8.51E−01 | 1.50E−01 | −3.91E−02 | 1.36E−02 | −4.77E−03 | 1.69E−03 | −3.62E−04 |
| S6 | −1.10E+00 | 1.49E−01 | −3.69E−02 | 9.91E−03 | −2.48E−03 | 7.72E−04 | 3.47E−04 |

TABLE 18

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | −1.65E−05 | −2.44E−05 | −4.72E−06 | −2.70E−06 | 8.64E−06 | 7.03E−06 | 7.39E−06 |
| S2 | −1.62E−06 | −1.50E−05 | −3.42E−05 | −2.30E−05 | −2.05E−05 | −9.99E−06 | −4.07E−06 |
| S3 | −1.47E−04 | −5.31E−05 | 5.24E−06 | −1.42E−05 | 1.54E−05 | −8.86E−06 | 6.56E−06 |
| S4 | −6.98E−05 | −4.52E−05 | −1.21E−05 | −4.76E−05 | −1.05E−05 | −1.35E−05 | −3.40E−06 |
| S5 | 1.06E−05 | 1.38E−04 | −1.43E−04 | 1.10E−04 | −7.98E−05 | 2.28E−05 | 0.00E+00 |
| S6 | −9.20E−05 | 6.22E−05 | −3.26E−04 | 3.60E−06 | −5.90E−05 | 9.67E−05 | 0.00E+00 |

Figure 12A:
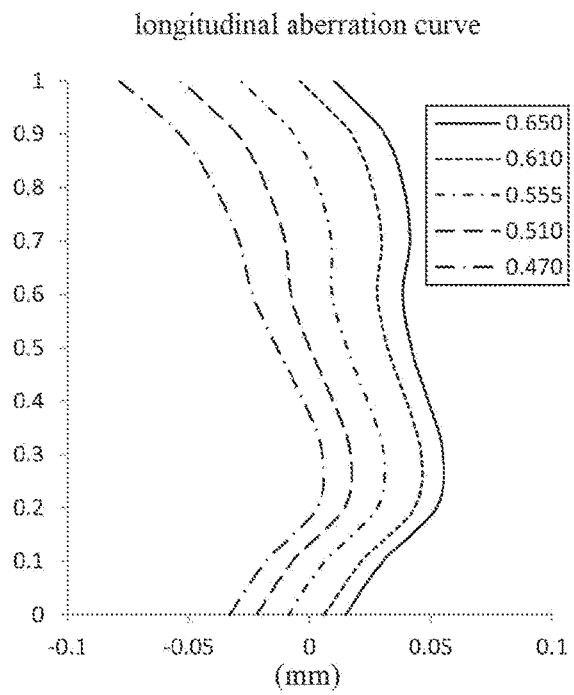
FIGS. 12A to 12D respectively show a longitudinal aberration curve, an astigmatic curve, a distortion curve and a lateral color curve of the optical imaging lens assembly according to Embodiment 6.
Figure 12B:
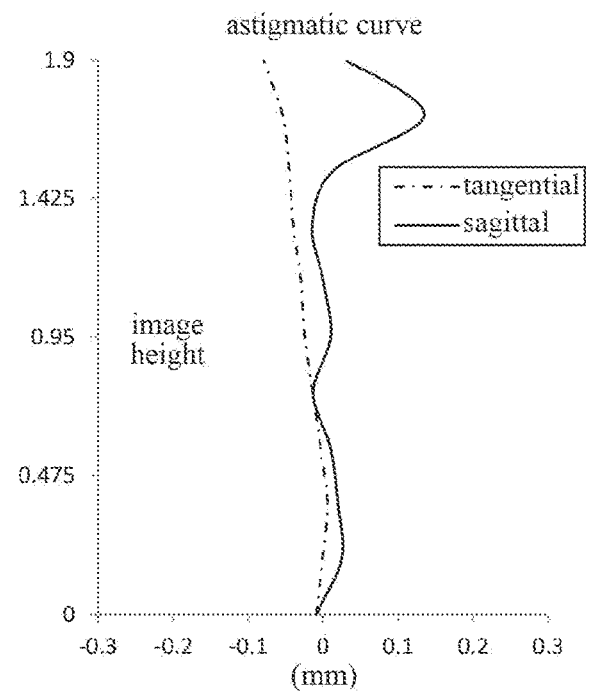
Figure 12C:
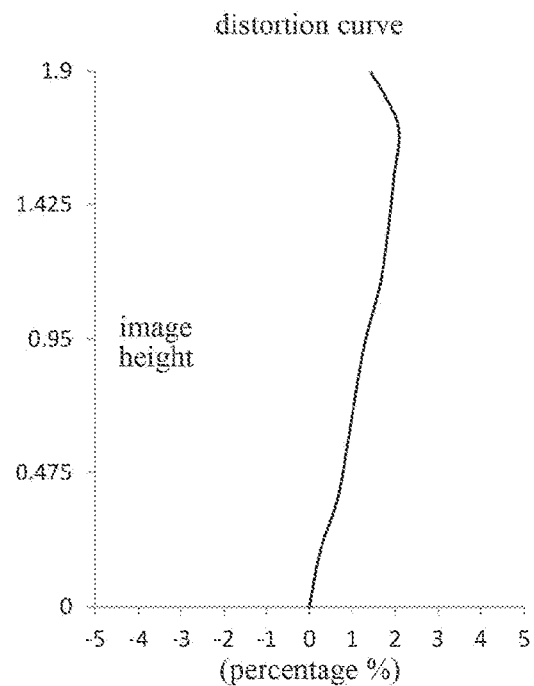
Figure 12D:
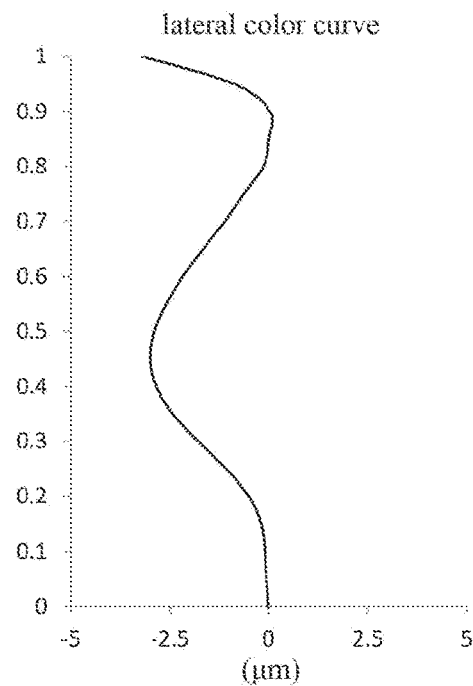

FIG. 12A illustrates a longitudinal aberration curve of the optical imaging lens assembly according to Embodiment 6, representing deviations of focal points of light of different wavelengths converged after passing through the lens assembly. FIG. 12B illustrates an astigmatic curve of the optical imaging lens assembly according to Embodiment 6, representing a curvature of a tangential image plane and a curvature of a sagittal image plane. FIG. 12C illustrates a distortion curve of the optical imaging lens assembly according to Embodiment 6, representing amounts of distortion corresponding to different image heights. FIG. 12D illustrates a lateral color curve of the optical imaging lens assembly according to Embodiment 6, representing deviations of different image heights on the image plane after light passes through the lens assembly. It can be seen from FIGS. 12A to 12D that the optical imaging lens assembly given in Embodiment 6 can achieve a good imaging quality.

In addition, in Embodiments 1-6, the total effective focal length f of the optical imaging lens assembly, the effective focal lengths f1 to f3 of the lenses, the distance TTL from the object-side surface of the first lens to the image plane of the optical imaging lens assembly along the optical axis, half of the diagonal length ImgH of the effective pixel area on the image plane of the optical imaging lens assembly, the maximal field-of-view Semi-FOV of the optical imaging lens assembly, the f-number Fno of the optical imaging lens assembly and the magnification M of the optical imaging lens assembly are shown in table 19.

TABLE 19

| parameters/embodiment | 1 | 2 | 3 | 4 | 5 | 6 |
|---|---|---|---|---|---|---|
| f(mm) | 1.26 | 1.25 | 1.24 | 1.18 | 1.06 | 0.98 |
| f1(mm) | 1.20 | 1.20 | 1.20 | 1.17 | 1.11 | 1.06 |
| f2(mm) | −1.50 | −1.53 | −1.53 | −1.4 | −1.44 | −1.48 |
| f3(mm) | 1.75 | 1.78 | 1.75 | 1.65 | 1.49 | 1.44 |
| TTL(mm) | 3.41 | 3.38 | 3.41 | 3.44 | 3.50 | 3.50 |
| ImgH(mm) | 1.90 | 1.90 | 1.75 | 1.90 | 1.90 | 1.90 |
| Semi-FOV(°) | 42.2 | 42.0 | 41.9 | 41.7 | 41.4 | 41.4 |
| Fno | 3.20 | 3.20 | 3.20 | 3.45 | 3.50 | 3.55 |
| M | 0.80 | 0.80 | 0.78 | 0.94 | 1.19 | 1.39 |

The conditional expressions in Embodiments 1-6 respectively satisfy the relationships shown in Table 20.

TABLE 20

| conditional expression/embodiment | 1 | 2 | 3 | 4 | 5 | 6 |
|---|---|---|---|---|---|---|
| Fno/Tan(Semi-FOV) | 3.52 | 3.55 | 3.56 | 3.87 | 3.97 | 4.02 |
| \|f1/f + f2/f\| | 0.24 | 0.26 | 0.27 | 0.26 | 0.31 | 0.43 |
| OBL/TTL | 0.83 | 0.84 | 0.80 | 0.73 | 0.58 | 0.51 |
| f3/f2 | −1.17 | −1.16 | −1.15 | −1.12 | −1.03 | −0.97 |
| CT1/ET1 + ET2/CT2 | 3.24 | 3.25 | 3.36 | 3.32 | 3.27 | 3.17 |
| DT32/DT11 | 3.23 | 3.22 | 3.21 | 3.20 | 3.30 | 3.46 |
| (SAG11 + SAG12)/SAG22 | 0.66 | 0.66 | 0.72 | 0.66 | 0.55 | 0.48 |
| (SAG12 + SAG32)/SAG31 | −1.09 | −1.10 | −0.98 | −0.35 | 0.19 | 0.37 |
| ImgH/SAG21 | −5.44 | −5.54 | −5.18 | −5.86 | −6.11 | −6.26 |
| f/R3 + f/R4 | −6.24 | −6.06 | −5.86 | −5.52 | −4.93 | −4.61 |
| (R6 + R5)/(R6 − R5) | 4.92 | 4.94 | 4.91 | 4.68 | 4.81 | 5.57 |

The present disclosure further provides an imaging apparatus having an electronic photosensitive element for imaging. The electronic photosensitive element of the present disclosure may be a photosensitive charge coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, for example, technical solutions formed by replacing the features as disclosed in the present disclosure with (but not limited to) technical features with similar functions.

What is claimed is:

1. An optical imaging lens assembly, comprising, sequentially along an optical axis from an object side to an image side:
a first lens, having a positive refractive power;
a second lens, having a negative refractive power; and
a third lens, having a positive refractive power,
wherein, the optical imaging lens assembly satisfies:

$0.5 < M < 1.5$, where, M is a magnification of the optical imaging lens assembly, and wherein an axial distance SAG12 measured along the optical axis, from an intersection point of an image-side surface of the first lens and the optical axis to a vertex of an effective radius of the image-side surface of the first lens, an axial distance SAG32 measured along the optical axis, from an intersection point of an image-side surface of the third lens and the optical axis to a vertex of an effective radius of the image-side surface of the third lens, an axial distance SAG31 measured along the optical axis, from an intersection point of an object-side surface of the third lens and the optical axis to a vertex of an effective radius of the object-side surface of the third lens satisfy:

$|(SAG12 + SAG32)/SAG31| < 1.5$.

2. The optical imaging lens assembly according to claim 1, wherein an effective focal length f1 of the first lens, a total effective focal length f of the optical imaging lens assembly, and an effective focal length f2 of the second lens satisfy:

$0 < |f1/f + f2/f| < 0.5$.

3. The optical imaging lens assembly according to claim 1, wherein a distance OBL from a surface of an object close to the optical imaging lens assembly to a stop of the optical imaging lens assembly on the optical axis, and a distance TTL from an object-side surface of the first lens to an image plane of the optical imaging lens assembly along the optical axis satisfy:

$0.5 < OBL/TTL < 1.0$.

4. The optical imaging lens assembly according to claim 1, wherein an f-number Fno of the optical imaging lens assembly and half of a maximal field-of-view Semi-FOV of the optical imaging lens assembly satisfy:

$3.5 < Fno/Tan(Semi-FOV) < 4.5$.

5. The optical imaging lens assembly according to claim 1, wherein an effective focal length f2 of the second lens and an effective focal length f3 of the third lens satisfy:

$$-1.5<f3/f2<-0.5.$$

6. The optical imaging lens assembly according to claim 1, wherein a center thickness CT1 of the first lens on the optical axis, a center thickness CT2 of the second lens on the optical axis, an edge thickness ET1 of the first lens, and an edge thickness ET2 of the second lens satisfy:

$$3.0<CT1/ET1+ET2/CT2<4.0.$$

7. The optical imaging lens assembly according to claim 1, wherein a maximal effective radius DT32 of an image-side surface of the third lens and a maximal effective radius DT11 of an object-side surface of the first lens satisfy:

$$3.0<DT32/DT11<3.5.$$

8. The optical imaging lens assembly according to claim 1, wherein an axial distance SAG11 from an intersection point of an object-side surface of the first lens and the optical axis to a vertex of an effective radius of the object-side surface of the first lens, an axial distance SAG12 from an intersection point of an image-side surface of the first lens and the optical axis to a vertex of an effective radius of the image-side surface of the first lens, and an axial distance SAG22 from an intersection point of an image-side surface of the second lens and the optical axis to a vertex of an effective radius of the image-side surface of the second lens satisfy:

$$0<(SAG11+SAG12)/SAG22<1.0.$$

9. The optical imaging lens assembly according to claim 1, half of a diagonal length ImgH of an effective pixel area on an image plane of the optical imaging lens assembly, and an axial distance SAG21 from an intersection point of an object-side surface of the second lens and the optical axis to a vertex of an effective radius of the object-side surface of the second lens satisfy:

$$-6.5<ImgH/SAG21<-5.0.$$

10. The optical imaging lens assembly according to claim 1, wherein a total effective focal length f of the optical imaging lens assembly, a radius of curvature R3 of an object-side surface of the second lens, and a radius of curvature R4 of an image-side surface of the second lens satisfy:

$$-6.5<f/R3+f/R4<-4.5.$$

11. The optical imaging lens assembly according to claim 1, wherein a radius of curvature R5 of an object-side surface of the third lens and a radius of curvature R6 of an image-side surface of the third lens satisfy:

$$4.5<(R6+R5)/(R6-R5)<6.5.$$

* * * * *